United States Patent [19]

Johnson et al.

[11] Patent Number: 5,283,981
[45] Date of Patent: Feb. 8, 1994

[54] CAM FEED UNIT FOR A MACHINE TOOL

[75] Inventors: Merrill G. Johnson; Frank E. Stotts, both of Marion; Glen E. DeBoard, Wabash, all of Ind.

[73] Assignee: Dana Corporation, Toledo, Ohio

[21] Appl. No.: 6,743

[22] Filed: Jan. 21, 1993

[51] Int. Cl.⁵ .............................................. B24B 1/00
[52] U.S. Cl. ........................... 51/165.89; 51/165.79; 51/165.76; 51/165.77; 51/165.9; 82/137
[58] Field of Search ............ 51/72 R, 165.79, 165.89, 51/165.9, 165.91, 165.92, 165.76, 165.77; 82/133, 137; 409/183, 185, 206

[56] References Cited

U.S. PATENT DOCUMENTS

| | | |
|---|---|---|
| 2,254,098 | 8/1941 | Ziebolz . |
| 2,448,874 | 9/1948 | Flygare ........................... 51/165.91 |
| 2,521,979 | 9/1950 | Jagen ................... 51/165.91 |
| 2,674,232 | 4/1954 | Mason . |
| 2,681,595 | 6/1954 | Compte . |
| 2,767,620 | 10/1956 | Bentley . |
| 3,358,535 | 12/1967 | Hirschfeld et al. . |
| 3,803,957 | 4/1974 | Johnston et al. . |
| 3,878,761 | 4/1975 | Makowski ........................ 51/165.79 |
| 3,978,745 | 9/1976 | Okamoto . |
| 4,253,358 | 3/1981 | Schulze ................................ 82/137 |
| 4,528,876 | 7/1985 | Logue et al. . |
| 4,593,586 | 6/1986 | Cudnohufsky . |
| 4,679,472 | 7/1987 | Feller et al. . |
| 4,966,058 | 10/1990 | Garombo ............................ 82/137 |
| 5,181,442 | 1/1993 | Nezu ................................ 82/137 |

Primary Examiner—Jack Lavinder
Attorney, Agent, or Firm—Marshall & Melhorn

[57] ABSTRACT

A hydraulic cam feed unit is provided for moving a tool slide linearly towards and away from a workpiece. The feed unit comprises a hydraulic advance cylinder having a double rod, one end of which is connected to the tool slide to move the tool slide towards and away from the workpiece. A cam engaging member is connected to the opposite end of the double rod for linear movement with the double rod and the tool slide, and a cam is provided in selective engagement with the cam engaging member. A hydraulic feed cylinder has a single rod connected to the cam for linearly reciprocating the cam. When the cam is in engagement with the cam engaging member, the linear movement of the cam controls the linear movement of the tool slide.

19 Claims, 4 Drawing Sheets

CAM FEED UNIT FOR A MACHINE TOOL

BACKGROUND OF THE INVENTION

1. Field of the Invention

The invention relates generally to a feed unit for a machine tool. More particularly, the invention relates to a cam feed unit for controlling the movement of a machine tool toward and away from a workpiece.

2. Summary of Related Art

Machine tools, such as automatic lathes or automatic plunge type grinders, are usually comprised of a headstock having a rotatable spindle to support a workpiece and a tool carrying slide which is movable toward and away from the workpiece. A feed unit is generally provided for controlling the movement of the tool slide so that the tool slide can be advanced rapidly toward and away from the workpiece both before and after the actual machining operation, while being slowly fed toward the workpiece during the machining operation.

In the past, the feed unit for such machine tools was typically comprised of a single hydraulic cylinder with a servo-type valve having adjustable feeds. Such feed units, however, often provided relatively inconsistent feed of the tool slide and inadequate operator control. In response, many more recently produced automatic machine tools include computer numerically controlled feed units which provide greatly improved consistency, accuracy and ease of control. While such systems have performed well, they are relatively complex and may be prohibitively expensive in some instances.

SUMMARY OF THE INVENTION

The present invention relates to a cam feed unit for moving a tool slide linearly towards and away from a workpiece. The cam feed unit in accordance with the present invention comprises an advance means for linearly reciprocating a tool slide towards and away from a workpiece. A cam engaging member is connected to the advance means for linear movement with the tool slide. In addition, a cam is provided in selective engagement with the cam engaging member, and the unit is equipped with feed means for linearly reciprocating the cam. When the cam is in engagement with the cam engaging member, the linear movement of the cam controls the linear movement of the tool slide.

Thus, the present invention provides a basically simple and relatively inexpensive machine tool feed unit, having dependable operation, and smooth travel and reversals.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The cam feed unit of the present invention will be described herein with reference to its use with a plunge type grinder for ease of illustration. As those skilled in the art will appreciate, however, the cam feed unit of the present invention may be advantageously employed with any machine tool requiring the controlled movement of a machine tool toward and away from a workpiece.

Figure 1:
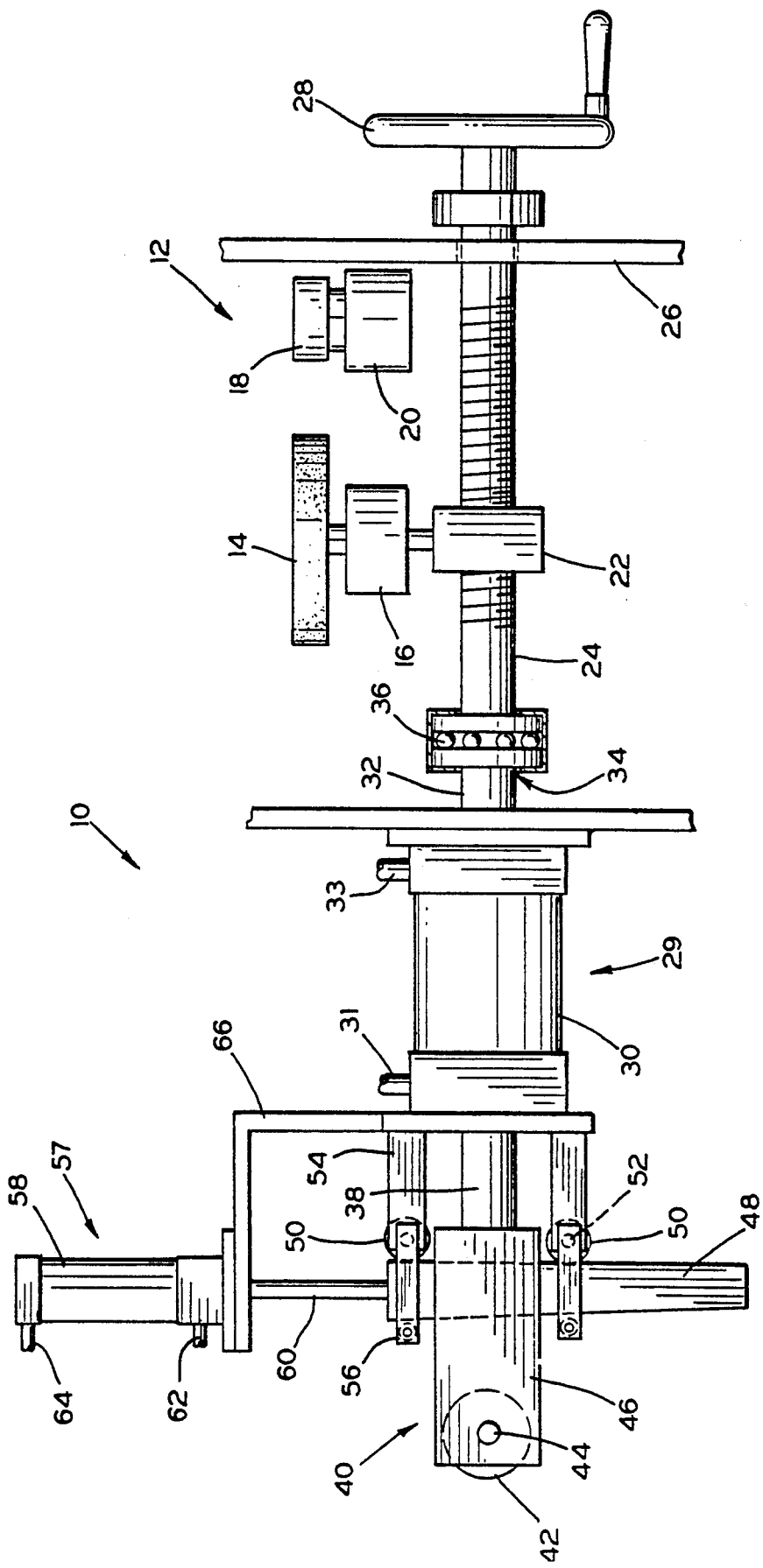
FIG. 1 is a somewhat schematic plan view of the feed unit of the present invention with the tool slide fully retracted from the workpiece.
Figure 2:
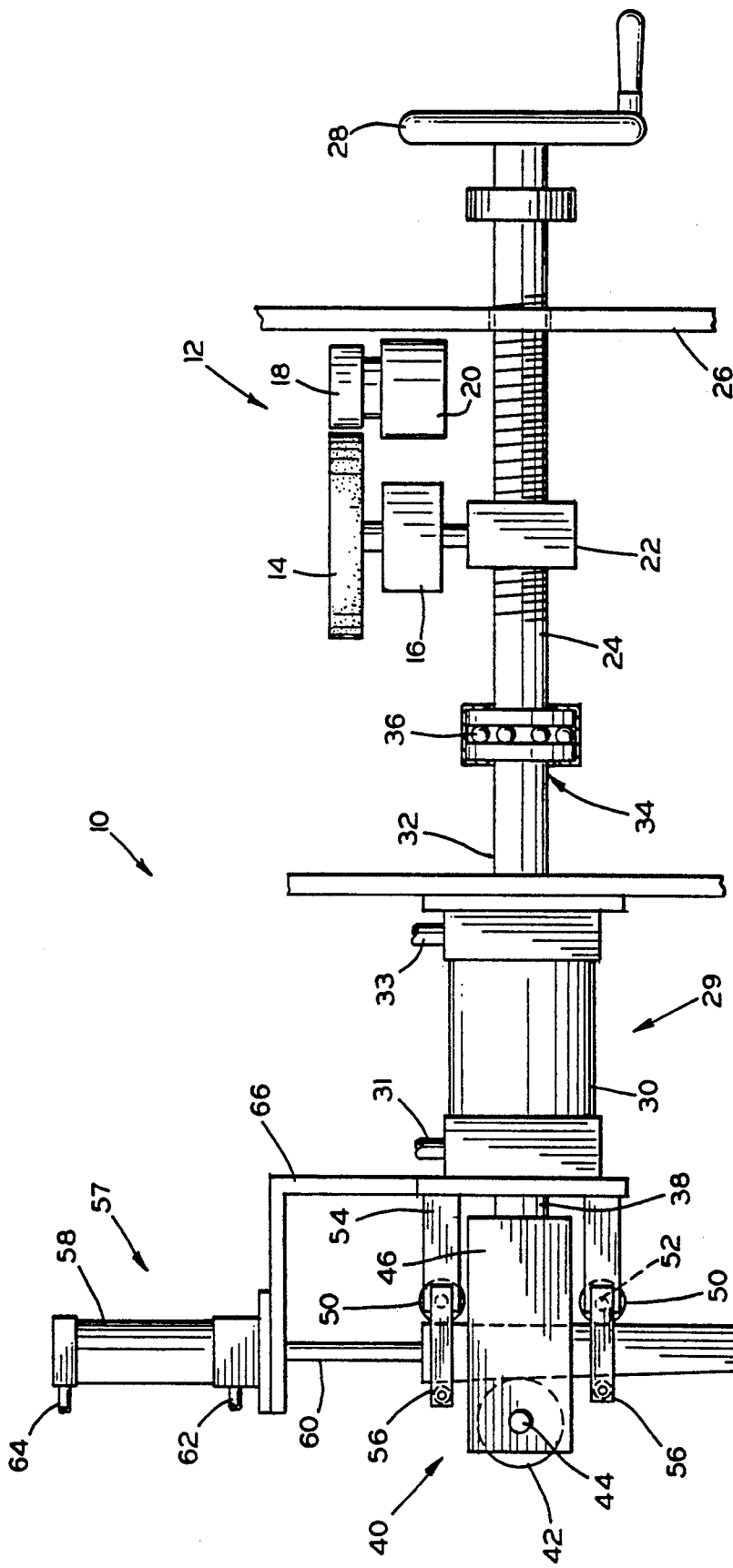
FIG. 2 illustrates the feed unit of FIG. 1 with the tool slide in the position after the rapid advance toward the workpiece, but prior to the feed movement.

Referring now to the drawings, there is illustrated in FIG. 1 a cam feed unit generally designated with the numeral 10 connected to a plunge type grinder 12 including a grinding wheel 14 mounted to tool slide 16. A workpiece 18 is rotatably mounted by a spindle (not shown) to the a headstock 20. The tool slide 16 is mounted by means of a nut 22 to a ball screw 24 which is mounted within the housing 26 of the grinder 12, with its axis in a plane perpendicular to the axis of the workpiece 18. Thus, axial movement of the ball screw 24 moves the tool slide 16 and grinding wheel 14 either toward or away from the workpiece 18. The grinding wheel 14, tool slide 16, workpiece 18, and headstock 20 are all shown schematically in the FIGS. 1-3.

One end of the ball screw 24 is journalled in and extends out of the grinder housing 26. This end of the ball screw 24 is provided with a hand wheel 28 which allows the operator to rotate the ball screw 24 relative to the nut 22, thus moving the nut 22, tool slide 16 and grinding wheel 14 along the length of the ball screw 24 to properly position the grinding wheel 14 during the set-up operation, in the conventional manner.

The opposite end of the ball screw 24 is connected to the cam feed unit 10. More particularly, the end of the ball screw 24 is connected to an advance means 29 for linearly reciprocating the ball screw 24 and tool slide 14 towards and away from the workpiece 18. The advance means 29 is preferably comprised of a double acting, hydraulic advance cylinder 30 which is mounted to the grinder housing 26. The advance cylinder 30 includes a double rod 32 and hydraulic fluid ports 31 and 33. The end of the ball screw 24 is connected to one end 34 of the double rod 32 for linear movement therewith. The ball screw 24 is connected to the end 34 by means including a bearing 36, so that the ball screw 24 is free to rotate relative to the double rod 32.

The opposite end 38 of the double rod 32 is connected to a cam engaging member 40. The cam engaging member 40 is affixed to the end 38 of the double rod 32 so that it reciprocates linearly therewith. The cam engaging member 40 is preferably comprised of a roller 42 rotatably mounted by means of a pin 44 between a pair of spaced support members 46, only one of which is visible in the drawings. The support members 46 are connected to and extend axially from the end 38 of the double rod 32.

A cam 48 is disposed between the roller 42 and the advance cylinder 30, so as to selectively engage the roller 42 when the double rod 32 and cam engaging member 40 are moved to the right by the introduction of hydraulic fluid into the port 31 on the advance cylinder 30. Two or more support rollers 50 abut the surface of the cam 48 opposite the surface engaged by the roller 42, thereby offering an opposing force to that exerted on the cam 48 by the roller 42. Each of the support rollers 50 is rotatably mounted by a pin 52 on the end of a bar 54, which may be affixed to the same end of the advance cylinder 30 from which the end 38 of the double rod 32 extends. Each bar 54 may also preferably include a cam restraint 56 extending around the cam 48, but having some space therebetween. The cam restraints 56 ensure that the cam 48 is not driven to the left, potentially damaging the single rod 60, upon the return of the double rod 32 and cam engaging member 40 in that direction.

The cam 48 is connected to a feed means 57 for linearly reciprocating the cam 48. The feed means 57 is preferably comprised of a double acting, hydraulic feed cylinder 58. The feed cylinder 58 includes a single rod 60 and hydraulic fluid ports 62 and 64. The end of the single rod 60 is connected to the cam 48 so that the cam 48 moves linearly with the single rod 60. The feed cylinder 58 is mounted so that its longitudinal axis is perpendicular to the longitudinal axis of the advance cylinder 30, and may preferably be mounted to the end of the advance cylinder 30 by means of an L-shaped bracket 66.

FIG. 1 illustrates the tool slide 16 in its fully retracted position. In this position, neither the advance cylinder 30 nor the feed cylinder 58 have been actuated. The tool slide 16 has been placed in the pre-determined proper starting position by the operator using the hand wheel 28. As described in greater detail below, the operator initiates a cycle which actuates the advance cylinder 30 by forcing hydraulic fluid into the port 31 to drive the double rod 32 to the right, to the position shown in FIG. 2.

Thus, actuation of the advance cylinder 30 drives the rod 32, ball screw 24, nut 22, tool slide 16 and grinding wheel 14 to right, or toward the workpiece 18. The movement of the double rod 32 to the right also draws the cam engaging means 40, and more specifically the roller 42, to the right until the roller 42 engages the cam 48. The support rollers 50 offer a sufficient opposing force that when the roller 42 engages the cam 48, movement of the double rod 32 to the right is stopped. The cam 48 is positioned relative to the roller 42 so that the engagement of the two stops the movement of the grinding wheel 14 just prior to its contacting the workpiece 18.

At this point in the operation, the feed cylinder 58 is actuated by supplying hydraulic fluid to the feed cylinder 58 to either advance or retract the single rod 60, depending upon the direction of the taper on the cam 48. If the cam 48 tapers away from the feed cylinder 58, as shown in the drawings, hydraulic fluid is supplied through the port 62, driving the single rod 60 upwardly and drawing the cam 48 towards the feed cylinder 58. On the other hand, if the cam 48 tapers toward the feed cylinder 58, hydraulic fluid is supplied through the port 64, driving the single rod 60 and the cam 48 away from the feed cylinder 58. For ease of illustration, the operation of the feed unit will be described hereinafter assuming that the cam 48 tapers away from the feed cylinder 58, as shown in the drawings.

Figure 3:
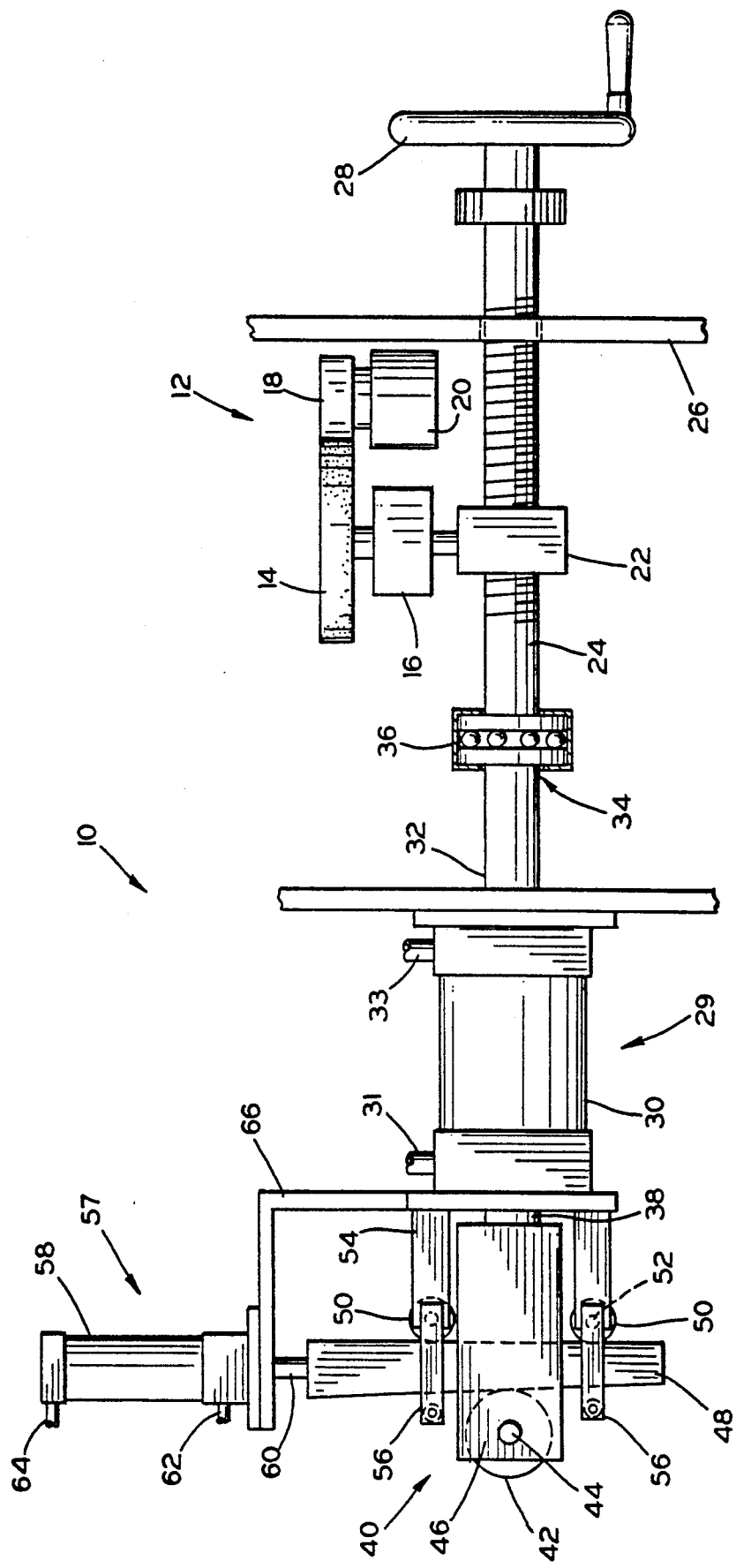
FIG. 3 illustrates the feed unit of FIG. 1 with the tool slide in the position after the feed movement.

Accordingly, the cam 48 will be drawn toward the feed cylinder 58, as shown in FIG. 3. This linear movement of the cam 48 reduces the thickness of the cam 48 between the roller 42 and the support rollers 50. During this movement of the cam 48, the advance cylinder 30 continues to be actuated, biasing the double rod 32 to the right. Thus, the linear movement of the cam 48 in the direction away from its taper end allows the double rod 32, and hence the grinding wheel 14, to feed to the right in a slow, controlled movement. It is as the cam 48 is moved by the feed cylinder 58 that the grinding wheel 14 is fed into the workpiece 18.

Once the machining of the workpiece 18 is completed, the advance cylinder 30 is returned to its initial position by supplying hydraulic fluid through the port 33, retracting the grinding wheel 14 from the workpiece 18. The feed cylinder 58 and cam 48 are returned to the initial position by supplying hydraulic fluid through port 64.

Figure 4:
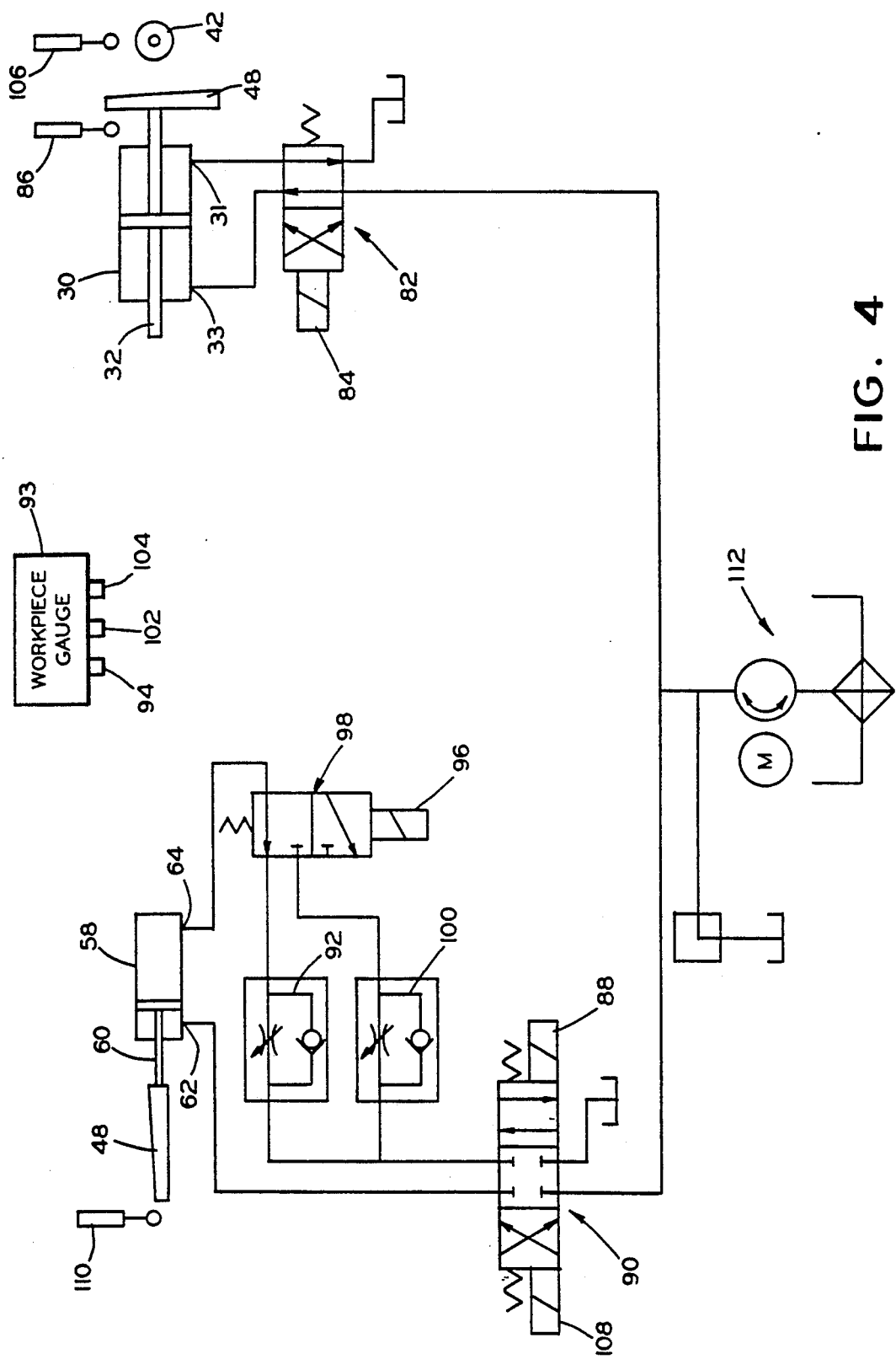
FIG. 4 is a schematic representation of the hydraulic control circuit for the feed unit of the present invention.

Referring now to the hydraulic circuit illustrated in FIG. 4, a preferred embodiment of the control means of the feed unit 10 is described in greater detail. After the operator has mounted the workpiece and placed the grinding wheel in its proper starting position, the feed cycle is initiated by operator activation of a push button (not shown) which is connected to a solenoid operated, two-position valve 82 controlling the supply of hydraulic fluid to the advance cylinder 30. The valve 82 is spring biased to its right position, in which fluid is supplied to the advance cylinder 30 through the port 33. When the push button is activated by the operator and the solenoid 84 of valve 82 is energized, the valve 82 is moved to is left position and hydraulic fluid is supplied to the advance cylinder 30 through the port 31, driving the grinding wheel 14 toward the workpiece until the roller 42 engages the cam 48. When the roller 42 contacts the cam 48, movement of the double rod 32 is stopped.

The limit switch 86, which is connected to a spring-centered, solenoid-operated, three-position valve 90, senses that the roller 42 has engaged the cam 48. The valve 90 controls the supply of hydraulic fluid to the feed cylinder 58. In response to the activation of the limit switch 86, the solenoid 88 is energized, moving the valve 90 to its right position and supplying fluid to the feed cylinder 58 through port 62. This causes the retraction of the rod 60, drawing the cam 48 toward the feed cylinder 58. At this point, the speed of the movement of the rod 60, and therefore of the feed of the grinding wheel 14 into the workpiece 18, is controlled by the flow control valve 92.

In a preferred embodiment of the invention, a workpiece gauge 93 is provided which measures the size of the workpiece 18 during the machining operation. Once the workpiece 18 has been reduced to a first pre-determined size, a first limit switch 94 in the gauge 93 is activated. The limit switch 94 is connected to the solenoid 96 of a solenoid operated, two-position valve 98 controlling flow from the feed cylinder 58 through one of two flow control valves, 92 or 100. The valve 98 is spring biased to the right position, normally directing the fluid flow through the flow control valve 92. When the solenoid 96 is energized by the activation of the limit switch 94, the fluid from the feed cylinder 58 is directed through the flow control valve 100. Flow control valve 100 provides a relatively greater restriction of flow compared with flow control valve 92, so that the speed of the movement of the rod 60, and hence of the feed of the grinding wheel 14 into the workpiece 18, is reduced when the flow is directed through flow control valve 100. This provides for a fine feed movement of the grinding wheel 14 to finish the machining of the workpiece 18.

When the gauge 93 determines that the workpiece has been machined to a second pre-determined size, almost to the finish size desired, a second limit switch 102 is activated. Activation of limit switch 102 operates to de-energize the solenoid 88, allowing the valve 90 to return to its center position. This stops any further movement of the rod 60 and the associated movement of the grinding wheel 14, allowing the grinding wheel 14 to dwell and spark-out the workpiece 18. A third limit switch 104 in the gauge 93 then senses the finish size of the workpiece 18. Activation of limit switch 104 operates to de-energize the solenoid 84, returning the valve 82 to its right position, and moving the double rod 32 and grinding wheel 14 away from the workpiece 18.

The return of the advance cylinder 30 to its starting position is sensed by the limit switch 106. Activation of limit switch 106 operates to energize a solenoid 108 on the valve 90 to move the valve 90 to its left position, supplying hydraulic fluid to the feed cylinder 58 through the port 62. This extends the rod 60 from the feed cylinder 58, returning the feed cylinder 58 to its starting position. The full extension of the rod 60 is sensed by the limit switch 110, the activation of which de-energizes the solenoid 108. This returns the valve 90 to its center position, and completes the feed cycle.

The hydraulic fluid for the aforedescribed components is supplied through a supply conduit connected to a conventional hydraulic pump system 112. Further, conventional circuitry is utilized to connect all of the switches to the respective solenoid operated valves.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A cam feed unit for moving a tool slide linearly towards and away from a workpiece, comprising:
   advance means for linearly moving said tool slide towards and away from a workpiece said advance means being stationary with respect the workpiece;
   a cam engaging member connected to said advance means for linear movement with said tool slide;
   a cam in selective engagement with said cam engaging member; and
   feed means for linearly reciprocating said cam, whereby when said cam is in engagement with said cam engaging member, the linear movement of said cam controls the linear movement of said tool slide.

2. A cam feed unit as defined in claim 1, wherein said cam is comprised of a tapered block.

3. A cam feed unit as defined in claim 1, wherein said cam is positioned so as to engage said cam engaging member as said advance means moves said tool slide and said cam engaging member towards the workpiece.

4. A cam feed unit as defined in claim 1, wherein said feed means linearly reciprocates said cam substantially perpendicularly to the axis of movement of said tool slide.

5. A cam feed unit as defined in claim 1, wherein said feed means is comprised of a hydraulic cylinder.

6. A cam feed unit as defined in claim 1, wherein said advance means is comprised of a double rod hydraulic cylinder.

7. A cam feed unit as defined in claim 6, wherein said tool slide is connected to one end of said double rod, and said cam engaging member is connected to the opposite end of said double rod.

8. A cam feed unit as defined in claim 7, wherein said cam engaging means is comprised of a cam-engaging roller rotatably mounted to the end of said double rod.

9. A cam feed unit as defined in claim 8, further comprising a plurality of support rollers mounted on said advance means so as to engage said cam opposite said cam-engaging roller.

10. A cam feed unit as defined in claim 1, further comprising sensing means for determining when said cam engaging means contacts said cam.

11. A cam feed unit as defined in claim 10, further comprising control means for actuating said feed means when said sensing means determines that said cam engaging means has made contact with said cam.

12. A hydraulic cam feed unit for moving a tool slide linearly towards and away from a workpiece, comprising:
   a hydraulic advance cylinder having a double rod, one end of which is connected to said tool slide to move said tool slide towards and away from a workpiece;
   a cam engaging member connected to the opposite end of the double rod of said hydraulic advance cylinder for linear movement with said double rod and said tool slide;
   a cam in selective engagement with said cam engaging member; and
   a hydraulic feed cylinder having a single rod connected to said cam for linearly reciprocating said cam, whereby when said cam is in engagement with said cam engaging member, the linear movement of said cam controls the linear movement of said tool slide.

13. A cam feed unit as defined in claim 12, wherein said cam is comprised of a tapered block.

14. A cam feed unit as defined in claim 12, wherein said cam is positioned so as to engage said cam engaging member as said advance cylinder moves said tool slide and said cam engaging member towards the workpiece.

15. A cam feed unit as defined in claim 12, wherein the axis of said advance cylinder is substantially perpendicular to the axis of said feed cylinder.

16. A cam feed unit as defined in claim 12, wherein said cam engaging means is comprised of a cam-engaging roller rotatably mounted to the end of said double rod.

17. A cam feed unit as defined in claim 16, further comprising a plurality of support rollers mounted on said advance cylinder so as to engage said cam opposite said cam-engaging roller.

18. A cam feed unit as defined in claim 12, further comprising sensing means for determining when said cam engaging means contacts said cam.

19. A cam feed unit as defined in claim 18, further comprising control means for actuating said feed means when said sensing means determines that said cam engaging means has made contact with said cam.

* * * * *